Figure 1:
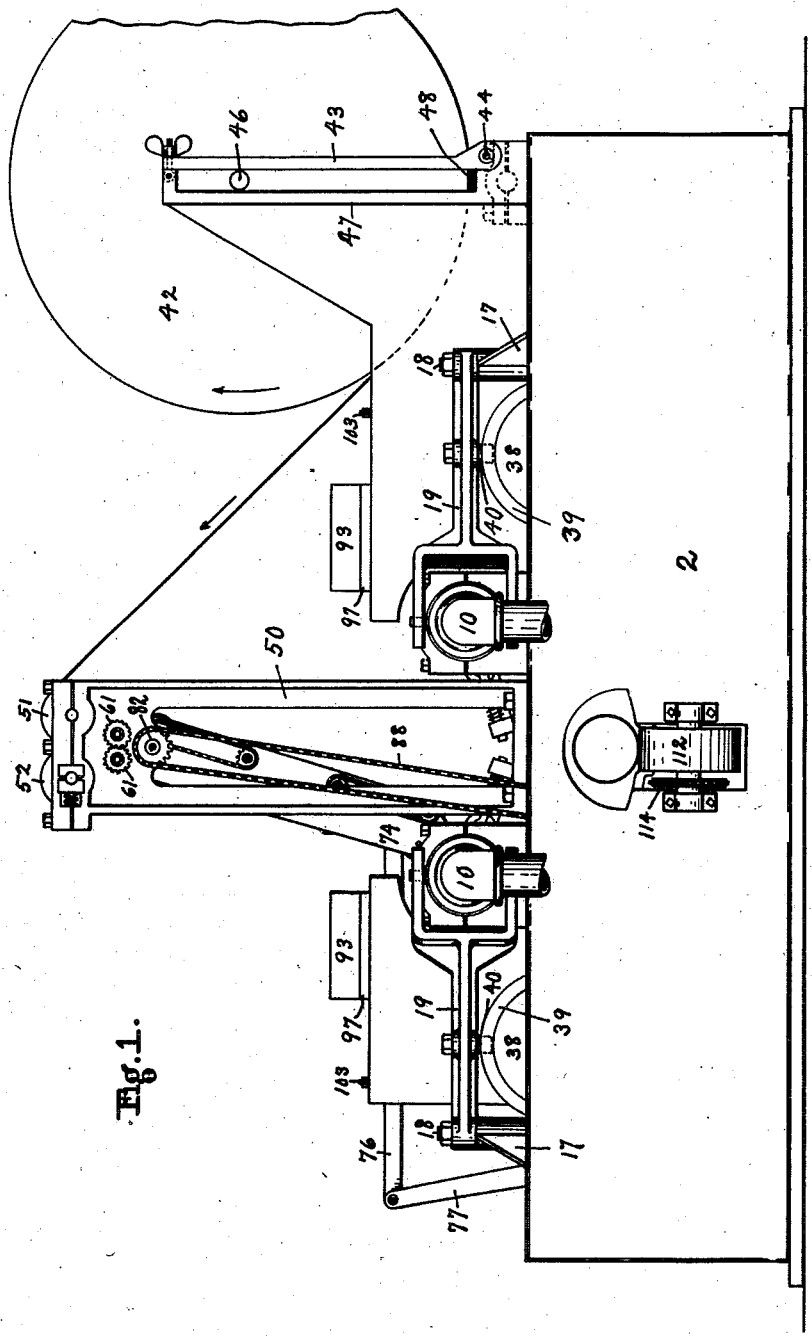

J. R. HARBECK.
TUBE MACHINE.
APPLICATION FILED JULY 3, 1908.

994,998.

Patented June 13, 1911.
7 SHEETS—SHEET 1.

Witnesses.
J. N. Perrault
O. B. Baenziger.

Inventor.
J. R. Harbeck.
By Edward N. Pagelsen. Att'y.

J. R. HARBECK.
TUBE MACHINE.
APPLICATION FILED JULY 3, 1908.

994,998.

Patented June 13, 1911.

7 SHEETS—SHEET 2.

J. R. HARBECK.
TUBE MACHINE.
APPLICATION FILED JULY 3, 1908.

994,998.

Patented June 13, 1911.
7 SHEETS—SHEET 4.

Witnesses.

Inventor
J. R. Harbeck.
By Edward N. Pagelsen. Atty.

J. R. HARBECK.
TUBE MACHINE.
APPLICATION FILED JULY 3, 1908.
994,998.
Patented June 13, 1911.
7 SHEETS—SHEET 5.
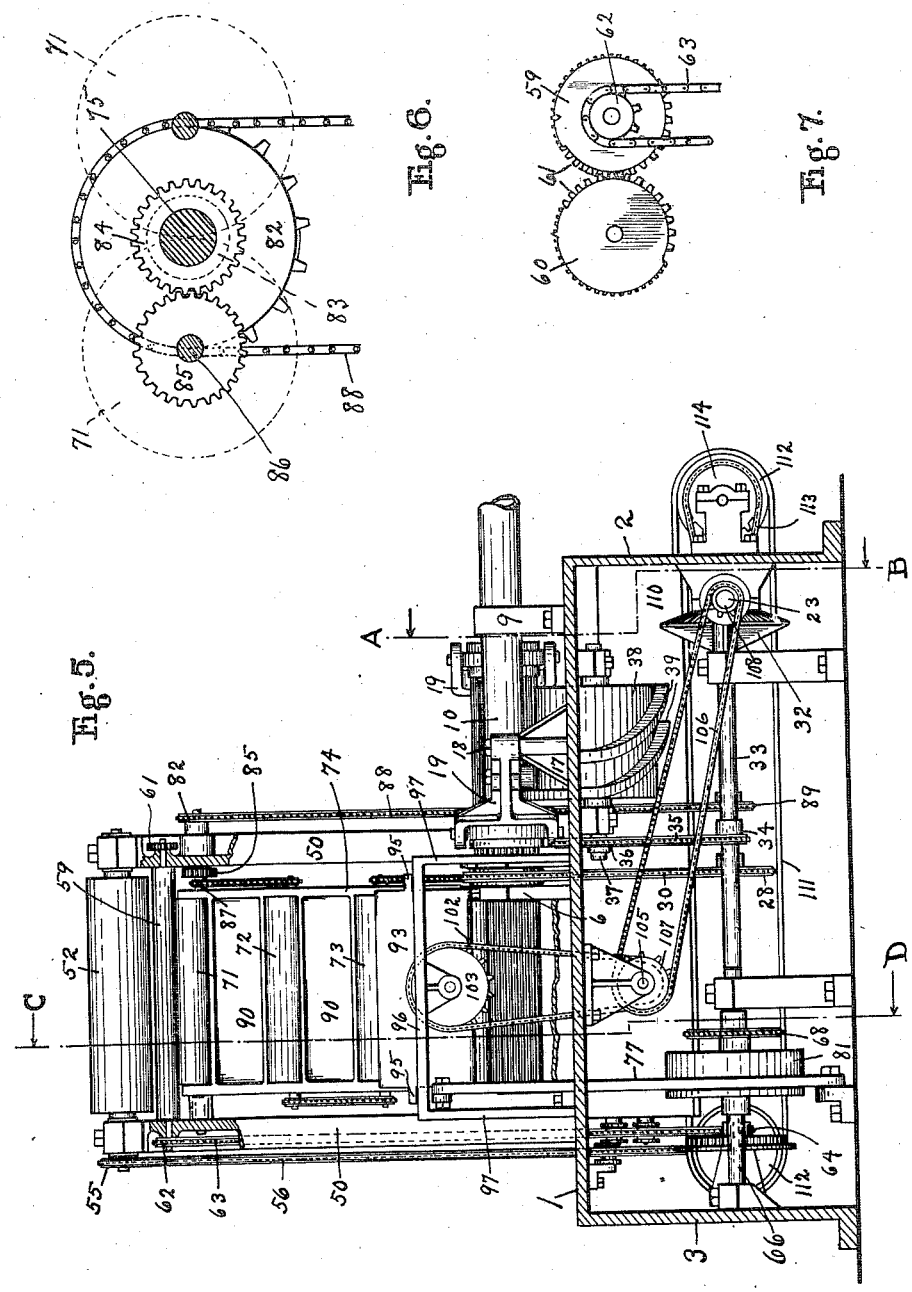

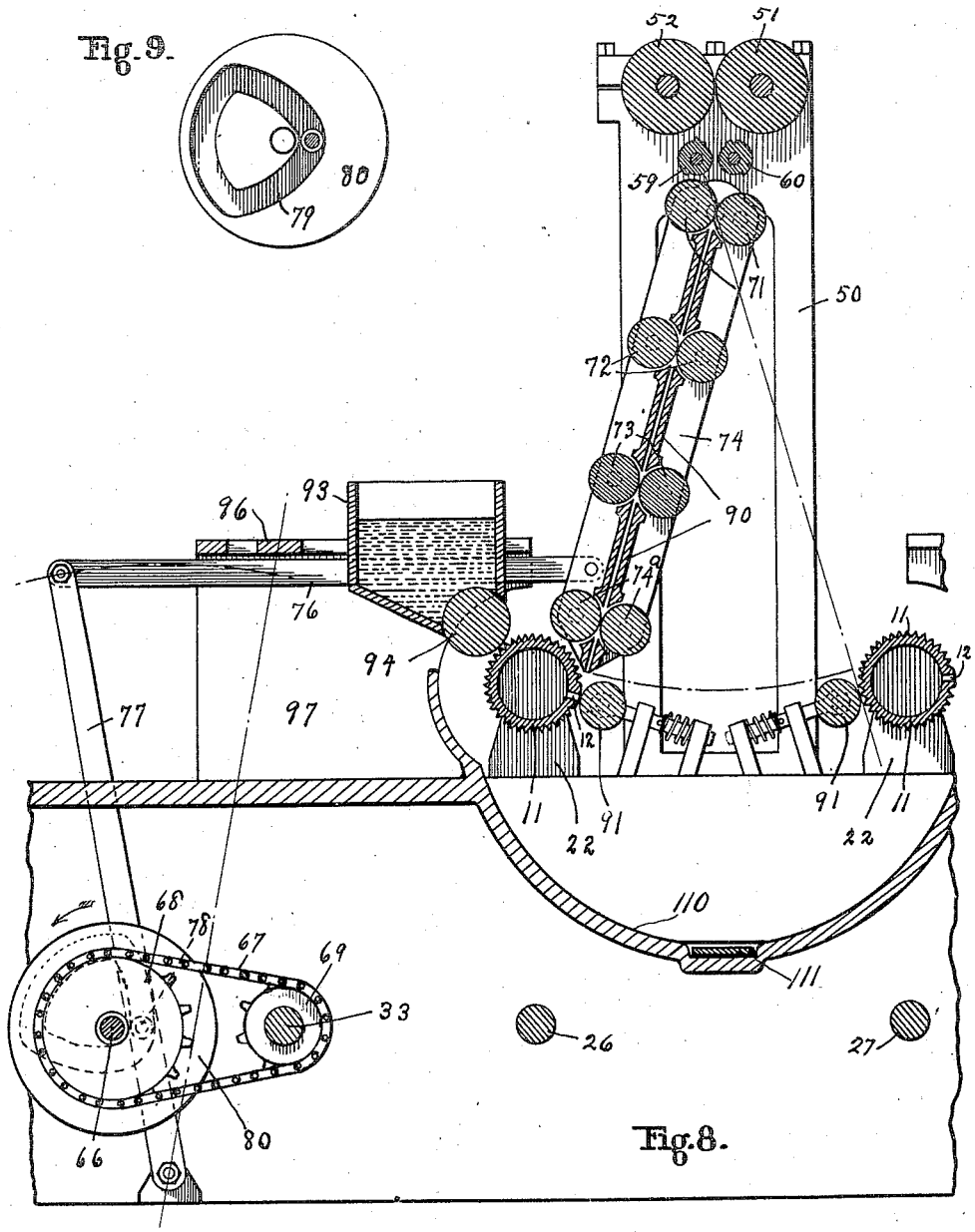

J. R. HARBECK.
TUBE MACHINE.
APPLICATION FILED JULY 3, 1908.

994,998.

Patented June 13, 1911.
7 SHEETS—SHEET 7.

Witnesses.
J. H. Ferrant
O. P. Baenziger

Inventor.
J. R. Harbeck.
By Edward N. Pagelsen, Atty.

UNITED STATES PATENT OFFICE.

JERVIS R. HARBECK, OF DETROIT, MICHIGAN, ASSIGNOR, BY MESNE ASSIGNMENTS, TO DETROIT CAN COMPANY, OF DETROIT, MICHIGAN, A CORPORATION OF NEW JERSEY.

TUBE-MACHINE.

994,998.  Specification of Letters Patent.  Patented June 13, 1911.

Application filed July 3, 1908. Serial No. 441,740.

*To all whom it may concern:*

Be it known that I, JERVIS R. HARBECK, a citizen of the United States, and a resident of Detroit, in the county of Wayne and State of Michigan, have invented a new and useful Tube-Machine, of which the following is a specification.

This invention relates to machines for forming tubes from fibrous material by concentrically winding the same upon a mandrel until the desired thickness is attained, and the object of these improvements is to provide a machine of this type with a plurality of winding mandrels so that the production of tubes shall be rapid, continuous and economical.

This invention consists in a pair of longitudinally slidable mandrels rotatably mounted in fixed bearings, each mandrel being adapted to wind up the tube material while the other is discharging.

It further consists in novel constantly running feeding means for the tube material, whereby the same is fed toward the winding mechanism at a constant speed equal to the winding speed of the winding mechanism.

It further consists in novel guiding mechanism whereby the tube material is conveyed to each of a plurality of mandrels alternately.

It further consists, in combination with the guiding mechanism, of shearing mechanism so mounted and positioned that the tube material for one mandrel will be severed before the guide changes position to direct the material to the other mandrel.

In tube winding machines, it has long been recognized that the starting and stopping of heavy rolls of tube material is objectionable, and that consequently it is most desirable to have a winding mechanism so constructed that the tube material will be consumed thereby at a constant rate. To accomplish this, two constantly running mandrels have been provided, each of which employs one half of its time for winding up the tubes, and the other half in discharging the tubes. In this machine therefore, tube winding is constantly carried on, and the feeding mechanism may run at a constant rate.

Figure 2:
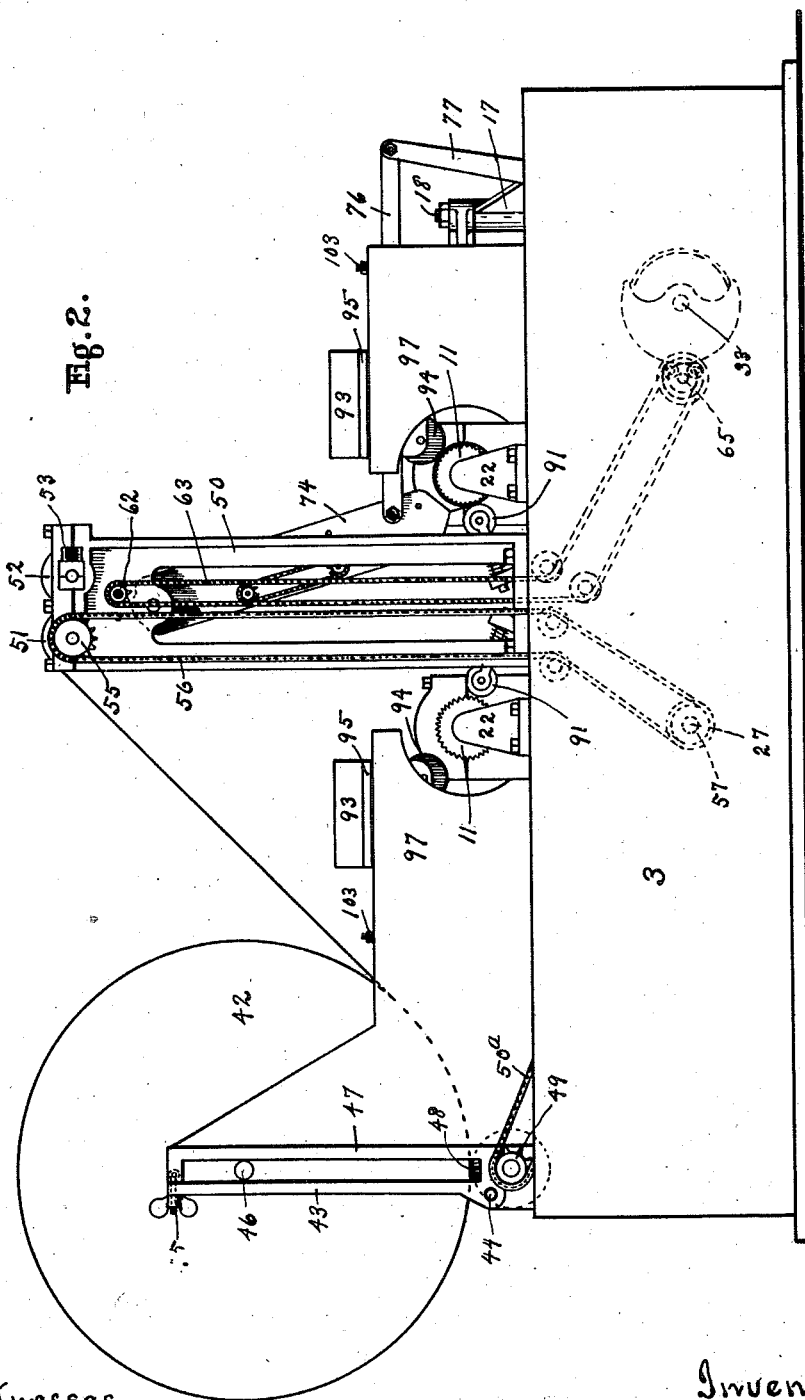
Figure 3:
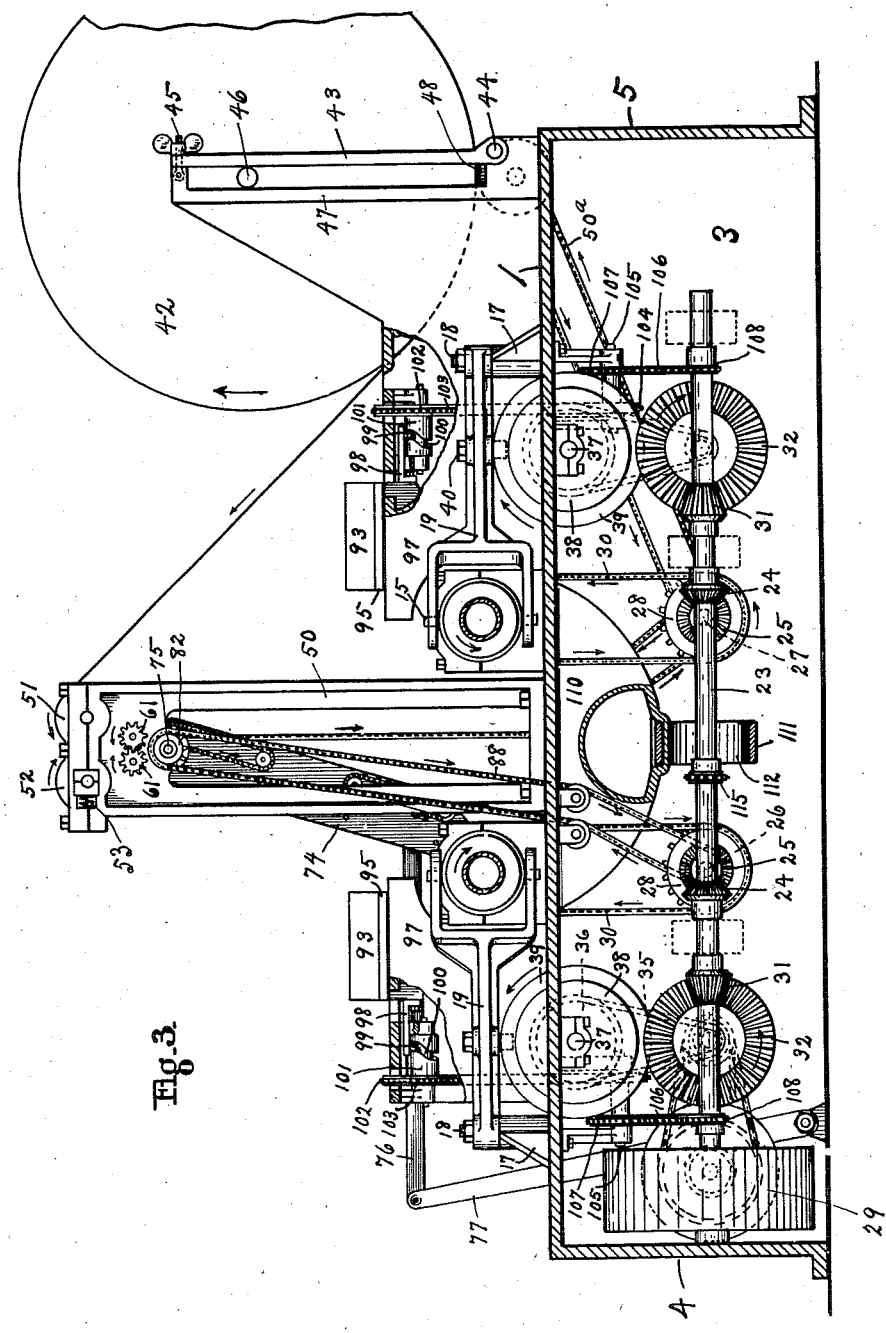
Figure 4:
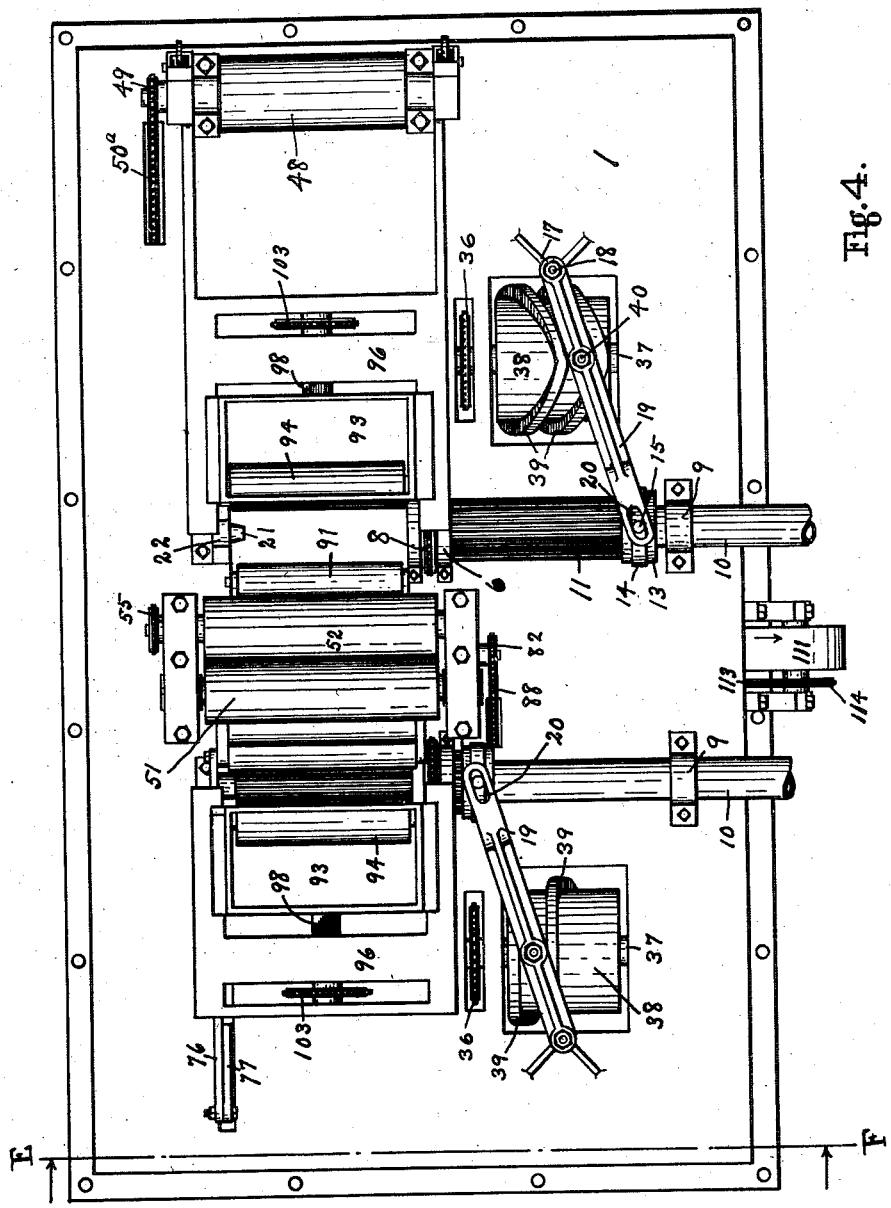
Figure 11:
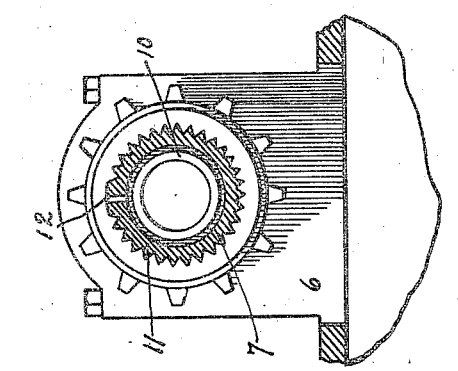
Figure 12:
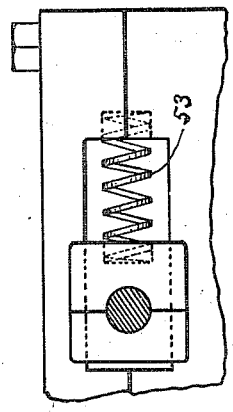

In the accompanying drawings, Figure 1 is a view of the right side and Fig. 2 of the left side of the machine. Fig. 3 is a cross section on the line A—B of Fig. 5. Fig. 4 is a plan. Fig. 5 is a front view, the casing being broken away on the line E—F of Fig. 4. Figs. 6 to 13 inclusive are details of various parts on larger scales, Fig. 8 being a cross section on the line C—D of Fig. 5, and Fig. 11 a cross section on the line G—H of Fig. 10.

Similar reference characters refer to like parts throughout the several views.

In this machine a table or base 1 is supported by sides 2, 3, 4, and 5, which together form a casing, all resting on a foundation which separately may carry some of the bearings of the driving mechanism. On the table are the bearings 6 for the hubs 7 of the sprocket wheels 8. Secured to plate 1 are the standards 9 which support the suction pipes 10. The wheels 8 (Figs. 10 and 11) are bored and slotted to form teeth which enter grooves in the longitudinally slidable tube mandrels 11, which are hollow and provided with a longitudinal row of suction holes 12. A collar 13 is secured to the outer end of each mandrel, which collars are provided with circumferential grooves to receive the rings 14 which are provided with pins 15.

Figure 10:
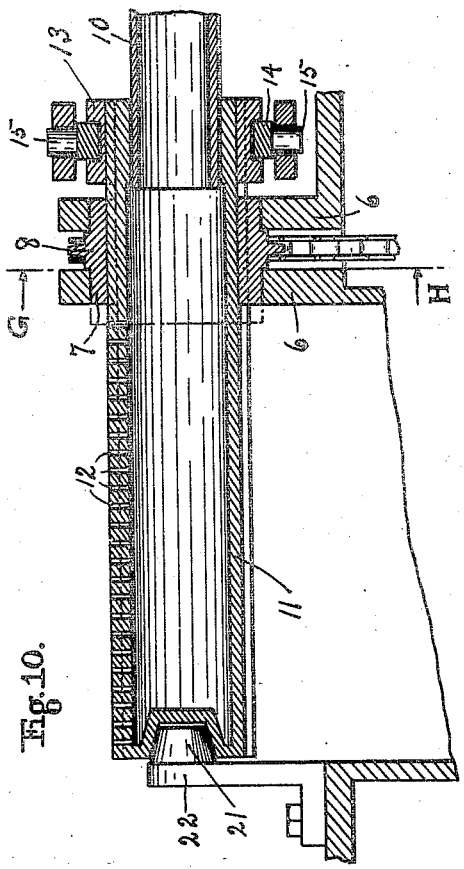
Figure 13:
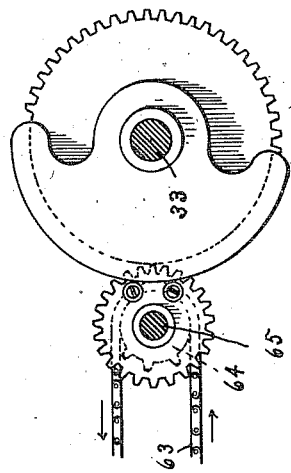

Upwardly projecting brackets 17 carry pins 18, on which are pivoted the levers 19, in the outer ends of which are slots 20 in which the pins 15 engage. The mandrels are slid longitudinally by means of these levers, in the bore of the hubs 7 and on the pipes 10, the bores of the mandrels forming air tight joints with these pipes. The teeth in the bores of the hubs not only serve to drive the mandrels for winding purposes, but they also serve to remove the tubes from the mandrels. Brackets 22 are secured to the plate 1 and carry cone shaped lugs 21 adapted to form supports for the inner ends of the mandrels during the time of winding, as shown in Fig. 10.

Mounted in the casing is a main shaft 23 to which are secured two bevel gears 24 which mesh with the bevel gears 25 to drive the parallel shafts 26 and 27 in opposite directions. On these shafts 26 and 27 are secured the sprocket wheels 28, which drive the wheels 8 and the mandrels 11 by means of the chains 30. The pulley 29 drives the shaft 23. Secured on this main shaft 23 are other bevel pinions 31 which engage the bevel gears 32 on the shafts 33. These shafts carry the sprocket wheels 34 on which the chains 35 run, which chains also engage the wheels 36 on the shafts 37, which shafts also carry the drums 38. Rings 39 properly spaced and positioned on these drums 38 form the cams for actuating the levers 19, through the small rollers carried on the pins 40. For each cycle of the machine, that is, at the forming of a tube, the shafts 37 make one revolution, and each mandrel makes a sufficient number of revolutions to wind a tube while the other is discharging, and makes an equal number of revolutions while the other is winding, in the mean time sliding to the right (Fig. 10) until the tube is discharged and then returning to original position.

The heavy roll of paper 42 is mounted on the shaft 46 which is guided at the rear of the machine by the guide bars 43 which are pivoted at 44 and held in position by the bolts 45. The end of the machine is provided with a vertical flange 47 which also serves to guide the shaft 46. See Fig. 3. The roll of paper rests on the constantly running roll 48 which is driven by the sprocket wheel 49. See Fig. 4. A chain 50ª connects to this sprocket wheel and to a sprocket wheel of proper size on the shaft 27. The speed of the roll 48 is such, that tube material will be unwound at the same rate that the mandrels wind the same.

Vertically extending from the plate 1 are two frames 50 which carry rolls 51 and 52 at the upper ends. These rolls are held together by springs 53 which force the bearings of the roll 52 toward the roll 51. See Fig. 12. The rolls are driven by means of the sprocket wheel 55, the chain 56, and sprocket wheels 57 on the shaft 27, and the surface speed of these rolls is constant and equal to that of the mandrel.

Mounted in the frames 50 are shear rolls 59 and 60 as shown in Fig. 8, which are connected by means of the small gears 61 shown in Fig. 3. At the opposite end of one of the roll shafts from the gears 61 is a sprocket wheel 62 connected directly to the shaft of the roll 59. A chain 63 is driven by a sprocket wheel 64 on the shaft 65, which shaft is given a full revolution at each revolution of the shaft 33 by the intermittent gearing shown in Fig. 13. These shear rolls make one revolution for each tube, that is, two revolutions at each cycle of the machine, the cycle of the machine being the operations during the forming of a tube on one mandrel. A shaft 66 is driven by means of a chain 67 which passes around the wheel 68 on this shaft, and around a smaller wheel 69 on the shaft 33. See Fig. 8.

After the material has been sheared by means of the rolls 59 and 60, a new portion feeds down between the pairs of rolls 71, 72, 73 and 74ª that are carried by the pendulum-like frame 74. These rolls guide the tube material, but are not in such close adjustment as to prevent the material being pulled from between them at more than their surface speed. This frame is hung on the pivots 75 between the frames 50, and to its lower end is connected a link 76 which also connects to the upper end of the lever 77. (Fig. 8.) This lever carries a pin 78 which is adapted to travel in the cam groove 79 in the disk 80. This cam groove is formed of four parts, two rests of 90 degrees each and two actuating portions of the same angularity. The disk is mounted on the shaft 66 which makes one revolution for each cycle of the machine. The movement of the frame 74 will therefore consist of two equal periods of rest, one at each mandrel and equal periods of movement between the rests. A drum 81 prevents the lever from moving away from the cam.

To drive the rolls 71, 72, 73 and 74ª the sprocket wheel 82 is secured to a sleeve 83 which also carries the gear 84 which sleeve is mounted on a pivot 75. A gear 85 on the shaft 86 of one roll 71 meshes with the gear 84 and the second roll 71 is driven by friction from the first. On the shaft 86 is a sprocket wheel 87 which connects by chain to another sprocket wheel on one roll 72. This roll in turn drives a roll 73 by means of chain gearing as shown in Fig. 5, and rolls 74ª are in turn driven by the rolls 73. The chain 88 passes around the wheel 82 and the wheel 89 on the shaft 26. Between the rolls 71, 72, 73 and 74ª, the tube material is guided by the plates 90. The sleeve 83 forms a bearing for one pivot pin 75. Spring held rolls 91, Figs. 2 and 8, force the tube material toward the mandrels. These rolls contact with the mandrels and are driven thereby.

To coat the tube material with glue or other cement, any desirable mechanism may be employed. That shown in the drawings is a pair of rectangular boxes 93 having freely revolving rolls 94 in their bottoms, which rolls are adapted to turn when they contact with the mandrels. As it is desirable that these rolls should not smear glue on the mandrel direct, and to leave the outside of the tube clean, means are provided to move the glue receptacles in and out from the mandrels. The receptacles 93 have flanges 95 that rest on the plates 96 carried by the side frames 97. Arms 98 (Fig. 3) project outward and carry pins 99 that engage grooves 100 in the drums 101. These drums are driven by the chains 102 which run on the wheels 103 on the drums and 104 on the shafts 105. Chains 106 running on the wheels 107 on the shafts 105 and 108 on the shaft 23, drive the shafts 105 and drums 101, one revolution at each cycle of the machine, moving the rollers 94 into contact with the beginning of the first wrap of paper on the mandrel and removing the same just before the winding is completed. Formed transversely of the casing and beneath the frames 50 is a trough 110, in the bottom of which is a belt 111 which runs on pulleys 112. A sprocket chain 113 running on a wheel 114, which is connected to one pulley 112, as shown in Fig. 5, and on wheel 115 on the shaft 23, drives the belt.

The operation of the machine is as follows: The operator swings down the guide bars 43 and lifts the roll of paper or other tube material 42 to the position shown in Figs. 1, 2, and 3, so that the roll of paper rests on the roller 48. The end of the tube material is then moved up and the end passed over and down between the rolls 51 and 52, between the shear rolls 59 and 60, and between the rolls 71, 72, 73 and 74ª. The end will then project down to the contact point between the mandrel 11 and the presser roll 91, the parts thus far described being the position shown in Fig. 8. The machinery is then started and through the action of the air pump a suction occurs through the holes 12 in the mandrel which will draw the paper against the mandrel, winding it up on the same. As the paper is being wound one half of a wrap, the glue receptacle 93 is moved against the mandrel causing the outer surface of the paper to be coated. After the desired amount of paper has been wound and sufficient further material to complete the tube extends from the mandrel to the shear rolls, these shear rolls will operate to sever the paper. The mechanism to operate these shears is simple, well known, and need not be again described. Any other desirable shearing mechanism and driving mechanism for the same may be employed. If the machine is set so that the paper will be wrapped six times around the mandrel to form a tube, the cam 80, the lever 77, and the link 76 will begin to operate at the end of the third wind and the swinging frame 74 will move over toward the other mandrel during the next three winds. The shear will operate at the end of every six winds. The result will be that the paper will pull out from between the pairs of rolls carried by this swinging frame faster than the normal feed and the result will be that the next quantity of paper which is to be wound on the second mandrel will freely feed down between the rolls on this frame and reach the second mandrel in time to be gathered over the suction holes 12 and wound thereon. While the first three wraps of paper are wound on the second mandrel the cam rings 39 on the drum 38 are withdrawing the first mandrel which will cause the teeth in the hub of the driving wheel 8 to strip the tube from the mandrel. The tube will fall into the trough 110, on the belt 111, and be conveyed out of the machine. During the last three winds of the tube on the second mandrel and while the frame 74 is swinging toward the first mandrel, this mandrel is returned to winding position through the action of its lever 19, and at the instant that the paper reaches it, the mandrel will be in position for winding the next tube. It will be understood, however, that these numbers of wraps are only taken to illustrate the operation of the machine, that the amount of tube material employed, the number of wraps, the relative length of time necessary for moving the mandrels longitudinally to discharge a tube and the return to winding position may all be changed to suit requirements.

The object attained by longitudinally grooving the mandrel is explained in the Harbeck Patent No. 869,902, dated Nov. 5th, 1907. The length of the mandrel will of course depend upon the material employed and upon the purposes for which the tubes are to be used. Usually these tubes will be employed for the manufacture of containers and each tube will be cut into proper lengths for such container bodies on special machines. The general design of the machine and the various details in construction may be changed to suit various conditions by those skilled in the art without departing from the spirit of my invention. Thus instead of the mandrels being longitudinally slidable, the construction shown in Patent No. 862,390 dated Aug. 6, 1907, to J. R. Harbeck may be installed to remove the finished tubes. Any other desirable form of gearing may be substituted for the chain gearing so long as it is positive in its action, belting being objectionable because of its tendency to slip.

Having now explained my improvements, what I claim as my invention and desire to secure by Letters Patent is:—

1. In a tube machine, the combination of two revoluble mandrels, longitudinally slidable to discharge the finished tubes and mounted parallel to each other, an upright frame, stationary feed rolls for the tube material mounted in said frame a distance above the mandrels, a shearing device mounted below said rolls, a swinging frame mounted in said stationary frame, feeding devices mounted in said swinging frame, means to swing said frame so that the feeding devices may feed the tube material to the mandrels alternately, driving mechanism for actuating the various parts, and means for sliding each of the mandrels to discharge the finished tubes while the other mandrel is performing its winding operations.

2. In a tube machine, the combination of a stationary base, bearings mounted thereon, a plurality of mandrels revoluble and longitudinally slidable in said bearings, a movable guide for conducting tube material in turn to each of said mandrels, rolls for feeding material to said guide at a constant rate, driving mechanism for actuating the feeding devices and revolving the mandrels, and operating means for alternately sliding the mandrels longitudinally to discharge the finished tubes.

3. In a tube machine, the combination of a base, a frame mounted thereon adapted to guide a roll of tube material, means to revolve said roll to cause the tube material to unroll at a constant speed, an upright frame, feed rolls mounted thereon to feed the material constantly at the rate it is unwound, a pair of grooved cylindrical mandrels, means to revolve said mandrels to wind the tube material thereon, and means to guide the material to the mandrels alternately.

4. In a tube machine, the combination of a plurality of revoluble parallel mandrels lying in the same plane, stationary bearings for the same, a frame, a swinging guide pivoted on said frame above the plane of the mandrels, constantly running feeding devices carried by the guide and adapted to convey tube material to the mandrels, and mechanism adapted to swing the frame at regular intervals.

5. In a tube machine, the combination of a plurality of revoluble mandrels for winding the tubes, stationary bearings for the same, a frame, a guide pivoted at its upper end in said frame, rolls mounted in pairs in said guide adapted to convey the tube material to the mandrels, and mechanism adapted to swing the frame at regular intervals.

6. In a tube machine, the combination of a plurality of revoluble mandrels parallel to each other, stationary bearings for the same, a swinging guide for the tube material, constantly running feeding devices carried by the guide and adapted to convey tube material to the mandrels, and mechanism to swing the guide at regular intervals from one mandrel to the other.

7. In a tube machine, the combination of a pair of revoluble mandrels having axes parallel to each other, stationary bearings for the same, an oscillating feeding device to guide tube material to said mandrels alternately, a revoluble cam to reciprocate the mandrel to discharge the tubes, and means to drive the cam and the feeding device so that the feeding device will oscillate and the cam reciprocate the mandrel once for each predetermined number of revolutions of the mandrel.

8. In a tube machine, the combination of revoluble mandrels parallel to each other, and bodily movable feeding devices in pairs for conducting the tube material to each mandrel in turn.

9. In a tube machine, the combination of revoluble rigid longitudinally corrugated mandrels parallel to each other, a movable feeding device for conducting sheets of tube material to each mandrel in succession, and means to shift the feeding device from one mandrel before its rolling of the sheet into a tube is completed thereby drawing the sheet from the feeding device at a greater rate than the surface speed of the feeding device.

10. In a tube machine, the combination of two revoluble rigidly, longitudinally corrugated mandrels, stationary bearings for the same, means for feeding the tube material to the mandrels alternately, and means to cause the removal of the tubes from one mandrel during the winding operation of the other mandrel.

11. In a tube machine, the combination of means to support a roll of tube material, means to unroll said material at a constant speed, a pair of rigid, longitudinally corrugated mandrels, means to conduct the tube material to the mandrels alternately, and means to remove the finished tubes from each mandrel during the winding operation of the other mandrel.

12. In a tube machine, the combination of means to support a roll of tube material, means to unroll said material at a constant speed, a pair of mandrels, conducting means for the tube material, means to oscillate the same from one mandrel to the other, and means to slide each mandrel longitudinally to discharge the finished tube during the period the conducting means is supplying tube material to the other mandrel.

In testimony whereof I have signed this specification in the presence of two subscribing witnesses.

JERVIS R. HARBECK.

Witnesses:
EDWARD N. PAGELSEN,
A. F. WILCOX.